United States Patent
Chang et al.

(10) Patent No.: US 12,536,105 B2
(45) Date of Patent: Jan. 27, 2026

(54) METHOD FOR INTERMEDIATE PHYSICAL ADDRESS (IPA) REMAPPING AND ELECTRONIC DEVICE

(71) Applicant: MEDIATEK INC., Hsinchu (TW)

(72) Inventors: Chin-Wen Chang, Hsinchu (TW); Nicholas Ching Hui Tang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 63 days.

(21) Appl. No.: 18/518,782

(22) Filed: Nov. 24, 2023

(65) Prior Publication Data
US 2025/0173273 A1 May 29, 2025

(51) Int. Cl.
G06F 12/06 (2006.01)
G06F 12/02 (2006.01)
G06F 12/1009 (2016.01)

(52) U.S. Cl.
CPC ...... *G06F 12/1009* (2013.01); *G06F 12/0246* (2013.01); *G06F 12/0646* (2013.01)

(58) Field of Classification Search
CPC ............. G06F 12/1009; G06F 12/0246; G06F 12/0646
See application file for complete search history.

(56) References Cited

U.S. PATENT DOCUMENTS

| | | | | |
|---|---|---|---|---|
| 10,642,505 | B1 * | 5/2020 | Kuzmin | G06F 3/0679 |
| 11,709,598 | B2 * | 7/2023 | Zentz | G06F 3/0611 |
| | | | | 711/154 |
| 2005/0210218 | A1 * | 9/2005 | Hoogterp | H04L 67/1097 |
| | | | | 711/159 |
| 2010/0325368 | A1 * | 12/2010 | O'Brien | G06F 13/1652 |
| | | | | 711/170 |
| 2011/0072192 | A1 * | 3/2011 | Sartore | G06F 12/0868 |
| | | | | 711/E12.016 |
| 2017/0212844 | A1 * | 7/2017 | Williams | G06F 11/3419 |
| 2018/0074863 | A1 * | 3/2018 | Kung | G06F 12/0292 |
| 2022/0413702 | A1 * | 12/2022 | Liu | G06F 3/0679 |

OTHER PUBLICATIONS

R. B. Tremaine et al., "IBM Memory Expansion Technology (MXT)," in IBM Journal of Research and Development, vol. 45, No. 2, pp. 271-285, Mar. 2001, doi: 10.1147/rd.452.0271. (Year: 2001).*

* cited by examiner

*Primary Examiner* — Reginald G Bragdon
*Assistant Examiner* — Zakaria Mohammed Belkhayat
(74) *Attorney, Agent, or Firm* — McClure, Qualey & Rodack, LLP

(57) ABSTRACT

A method for intermediate physical address (IPA) remapping, applicable to a memory having multiple ranks are provided. The method includes the following steps. An extant mapping from IPAs to physical addresses (PAs) of the memory is monitored. A remapping from at least one IPA to at least one PA is executed to concentrate the PAs of the memory used by an application into one of the ranks of the memory.

19 Claims, 10 Drawing Sheets

S100+S102

S100+S102

S100+S102

METHOD FOR INTERMEDIATE PHYSICAL ADDRESS (IPA) REMAPPING AND ELECTRONIC DEVICE

FIELD OF THE INVENTION

The present invention relates to a method for intermediate physical address (IPA) remapping, and, in particular, to a method for IPA remapping to concentrate memory access.

DESCRIPTION OF THE RELATED ART

The access to dual-rank DRAM has timing constraints because it may need to switch between different ranks with the control of extra signals. Problems found by the measurements with benchmarks and gaming are as follows. First, playing games on devices with dual-rank DRAM causes more power consumption and performs worse than with single-rank DRAM. Second, the GPU scores captured on devices with dual-rank DRAM degrade dramatically than those with single-rank DRAM.

BRIEF SUMMARY OF THE INVENTION

An embodiment of the present invention provides a method for intermediate physical address (IPA) remapping. The method can be applied to a memory having multiple ranks. The method includes the following steps. An extant mapping from IPAs to physical addresses (PAs) of the memory is monitored. A remapping from at least one IPA to at least one PA is executed to concentrate the PAs of the memory used by an application into one of the ranks of the memory.

According to the method described above, a rank boundary is present between any two adjacent ranks. The step of monitoring the extant mapping from the IPAs to the PAs of the memory includes the following step. The extant mapping from the IP As to the PAs of the memory is monitored according to an allocation result of the memory According to the method described above, the step of executing the remapping includes the following steps. An allocated block and a maximum usage location in the IPAs are determined. An offset block between the rank boundary of a first rank among the ranks and the maximum usage location is determined. The offset block is a block that has not been allocated. A shifted offset block in the PAs of the memory is determined. The shifted offset block starts from the head of the PAs of the first rank and has the same size of the offset block. The remapping from the at least one IPA to the at least one PA of the memory is executed. When the remapping is executed, the allocated block in the IPAs is remapped to a target block in the PAs of the first rank. The target block is between the end of the shifted offset block and the rank boundary of the first rank.

According to the method described above, the step of executing the remapping includes the following step. An unallocated block is determined in the IPAs. The unallocated block starts from the tail of the IPAs of a second rank of the memory and has the same size of the offset block. When the remapping is executed, the unallocated block is mapped to the shifted offset block in the PAs.

According to the method described above, the step of executing the remapping includes the following step. The remaining IPAs of the first and second ranks of the memory are mapped to the PAs of the second rank of the memory when the remapping is executed.

According to the method described above, the step of executing the remapping includes the following steps. An allocated block and a maximum usage location are determined in the IPAs. The allocated block is classified as a permanent part and a transient part. The size of the transient part is reduced to generate a compressed transient part according to a size limitation. The permanent part and the compressed transient part form an updated allocated block. An offset block between the rank boundary of a first rank among the ranks and an updated maximum usage location is determined in the IPAs. The offset block is a block that has not been allocated. A shifted offset block is determined in the PAs of the memory. The shifted offset block starts from the head of the PAs of the first rank and has the same size of the offset block. The remapping from the IPAs of the memory to the PAs of the memory is executed. When the remapping is executed, the updated allocated block in the IPAs is remapped to a target block in the PAs of the first rank.

According to the method described above, the step of executing the remapping further includes the following steps. An unallocated block is determined in the IPAs. The unallocated block starts from the tail of the IP As of a second rank of the memory and has the same size of the offset block. When the remapping is executed, the unallocated block is mapped to the shifted offset block in the PAs.

According to the method described above, the step of executing the remapping further includes the following step. The remaining IPAs of the first and second ranks of the memory are mapped to the PAs of the second rank of the memory when the remapping is executed.

According to the method described above, the compressed transient part is generated by compressing, hot-cold page selecting, and/or swapping the transient part.

According to the method described above, the step of executing the remapping includes the following steps. An interesting rank among the ranks of the memory is selected for the application based on a memory footprint of the memory. The at least one IPA used by the application that is not mapping to at least one PA of the interesting rank is found. The at least one PA of the interesting rank that has not been allocated is found and reserved. The remapping from the found at least one IPA to the found at least one PA is executed.

An embodiment of the present invention also provides an electronic device. The electronic device includes a memory and a memory access request module. The memory has multiple ranks. A rank boundary is present between any two adjacent ranks. The memory access request module is electrically connected to the memory. The memory access request module is configured to monitor an extant mapping from intermediate physical addresses (IPAs) to physical addresses (PAs) of the memory and execute a remapping from at least one IPA to at least one PA to concentrate the PAs of the memory used by an application into one of the ranks of the memory. The memory access request module includes a first memory management unit (MMU) and a second MMU.

According to the electronic device described above, the first MMU or the second MMU monitors the extant mapping from the IPAs to the PAs of the memory according to an allocation result of the memory and determines an allocated block and a maximum usage location in the IPAs. The first MMU or the second MMU determines an offset block between the rank boundary of a first rank among the ranks and the maximum usage location. The offset block is a block that has not been allocated. The first MMU or the second MMU determines a shifted offset block in the PAs of the memory. The shifted offset block starts from the head of the PAs of the first rank and has the same size of the offset block.

According to the electronic device described above, the second MMU executes the remapping from the IPAs to the PAs of the memory. When the remapping is executed, the allocated block in the IPAs is remapped to a target block in the PAs of the first rank. The target block is between the end of the shifted offset block and the rank boundary of the first rank.

According to the electronic device described above, the first MMU or the second MMU determines an unallocated block in the IPAs. The unallocated block starts from the tail of the IPAs of a second rank of the memory and has the same size of the offset block. The second MMU remaps the unallocated block to the shifted offset block in the PAs and remap the remaining IPAs of the first and second ranks of the memory to the PAs of the second rank of the memory.

According to the electronic device described above, the first MMU or the second MMU monitors the extant mapping from the IPAs to the PAs of the memory according to an allocation result of the memory. The first MMU or the second MMU determines an allocated block and a maximum usage location in the IP As based on the allocation result. The first MMU or the second MMU classifies the allocated block as a permanent part and a transient part. The first MMU or the second MMU reduces the size of the transient part to generate a compressed transient part according to a size limitation, wherein the permanent part and the compressed transient part form an updated allocated block. The first MMU or the second MMU determines an offset block between the rank boundary of a first rank among the ranks and an updated maximum usage location in the IPAs. The offset block is a block that has not been allocated. The first MMU or the second MMU determines a shifted offset block in the PAs of the memory; wherein the shifted offset block starts from the head of the first rank of the memory and has the same size of the offset block.

According to the electronic device described above, the second MMU executes the remapping from the IPAs of the memory to the PAs of the memory. When the remapping is executed, the updated allocated block in the IPAs is remapped to a target block in the PAs of the first rank.

According to the electronic device described above, the first MMU or the second MMU determines an unallocated block in the IPAs. The unallocated block starts from the tail of the IPAs of a second rank of the memory and has the same size of the offset block. The second MMU remaps the unallocated block to the shifted offset block in the PAs and remaps the remaining IPAs of the first and second ranks of the memory to the PAs of the second rank of the memory.

According to the electronic device described above, the compressed transient part is generated by compressing, hot-cold page selecting, and/or swapping the transient part.

According to the electronic device described above, the first MMU or the second MMU monitors the extant mapping from the IPAs to the PAs of the memory according to an allocation result of the memory. The first MMU or the second MMU selects an interesting rank among the ranks of the memory for the application based on a memory footprint of the memory. The first MMU or the second MMU finds the at least one IPA used by the application that is not mapping to at least one PA of the interesting rank. The first MMU or the second MMU finds and reserves the at least one PA of the interesting rank that has not been allocated.

According to the electronic device described above, the second MMU executes the remapping from the found at least one IPA to the found at least one PA.

According to the electronic device described above, the first MMU is a S1 MMU, and the second MMU is a S2 MMU.

According to the electronic device described above, the first MMU is a S1 system MMU (SMMU), and the second MMU is a S2 SMMU.

According to the electronic device described above, the first MMU is operated by a high-level operating system (HLOS), and the second MMU is operated by a hypervisor.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

In order to make the above purposes, features, and advantages of some embodiments of the present invention more comprehensible, the following is a detailed description in conjunction with the accompanying drawings.

Certain terms are used throughout the description and the following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" and/or "include" used in the present invention are used to indicate the existence of specific technical features, values, method steps, operations, units and/or components. However, it does not exclude the possibility that more technical features, numerical values, method steps, work processes, units, components, or any combination of the above can be added.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present invention.

Figure 1:
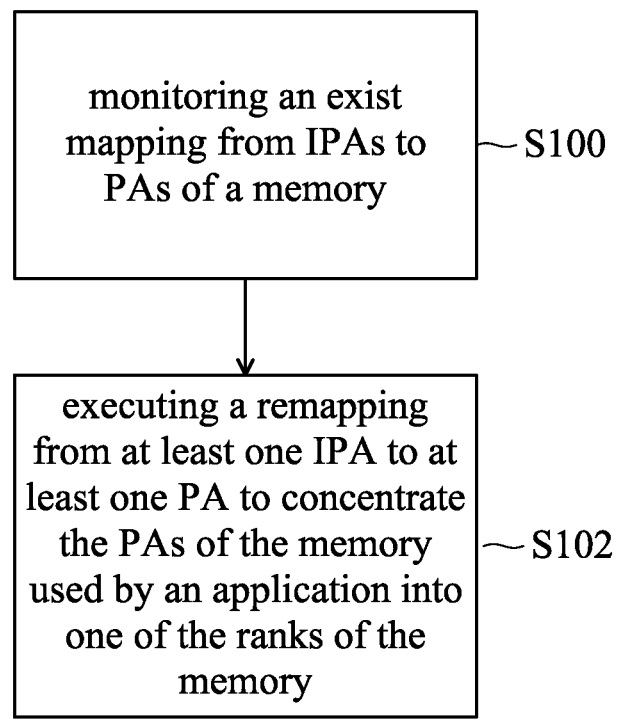
FIG. 1 is a flow chart of a method for intermediate physical address (IPA)/IP As remapping in accordance with some embodiments of the present invention.

FIG. 1 is a flow chart of a method for intermediate physical address (IPA)/IP As remapping in accordance with some embodiments of the present invention. The flow chart in FIG. 1 is applicable to a memory access request module inside an electronic device that can access a memory having multiple ranks. The memory access request module in the present invention could be a processor (such as, a central processing unit (CPU), a Graphics Processing Unit (GPU), a microprocessor, etc.) or other component of the device (such as, a Multimedia hardware equipment (such as, Image Signal Processor (ISP), display)), a connectivity related module (such as, I/O controller), etc.), and the electronic device could be a desktop, laptop, tablet, and smart phone, but the present invention is not limited thereto. In some embodiments, the memory may be a dynamic random-accesses memory (DRAM), but the present invention is not limited thereto.

As shown in FIG. 1, the method for IPA/IPAs remapping includes the following steps. An extant mapping from IP As to physical addresses (PAs) of a memory is monitored (step S100). A remapping from at least one IPA to at least one PA is executed to concentrate the PAs of the memory used by an application into one of the ranks of the memory (step S102). After step S102, the memory is accessed by the application based on the remapping result. In this disclosure, the application could be any object that can use the ranks of the memory, for example, the application is a game application or a driver application, etc.

In some embodiments, the memory access request module inside the electronic device is a processor, and the processor may include a first memory management unit (MMU) and a second MMU. The method in FIG. 1 is executed by the first MMU or/and the second MMU. In some embodiments, the first MMU may be a S1 MMU, and the second MMU may be a S2 MMU. In some embodiments, the first MMU may be a S1 MMU, and the second MMU may be a S2 SMMU (System Memory Management Unit), but the present invention is not limited thereto. In some embodiments, the module inside the electronic device are other components of the device (such as, a Multimedia hardware equipment (for example, Image Signal Processor (ISP), Display), a connectivity related module (such as, I/O controller), etc.), the first MMU may be a S1 SMMU, and the second MMU may be a S2 SMMU, but the present invention is not limited thereto. In some embodiments, the first MMU is operated by a high-level operating system (HLOS), and the second MMU is operated by a hypervisor, but the present invention is not limited thereto. In some embodiments, the memory includes multiple ranks (for example, the memory is a dual-rank DRAM). A rank boundary is present between any two adjacent ranks.

Figure 2:
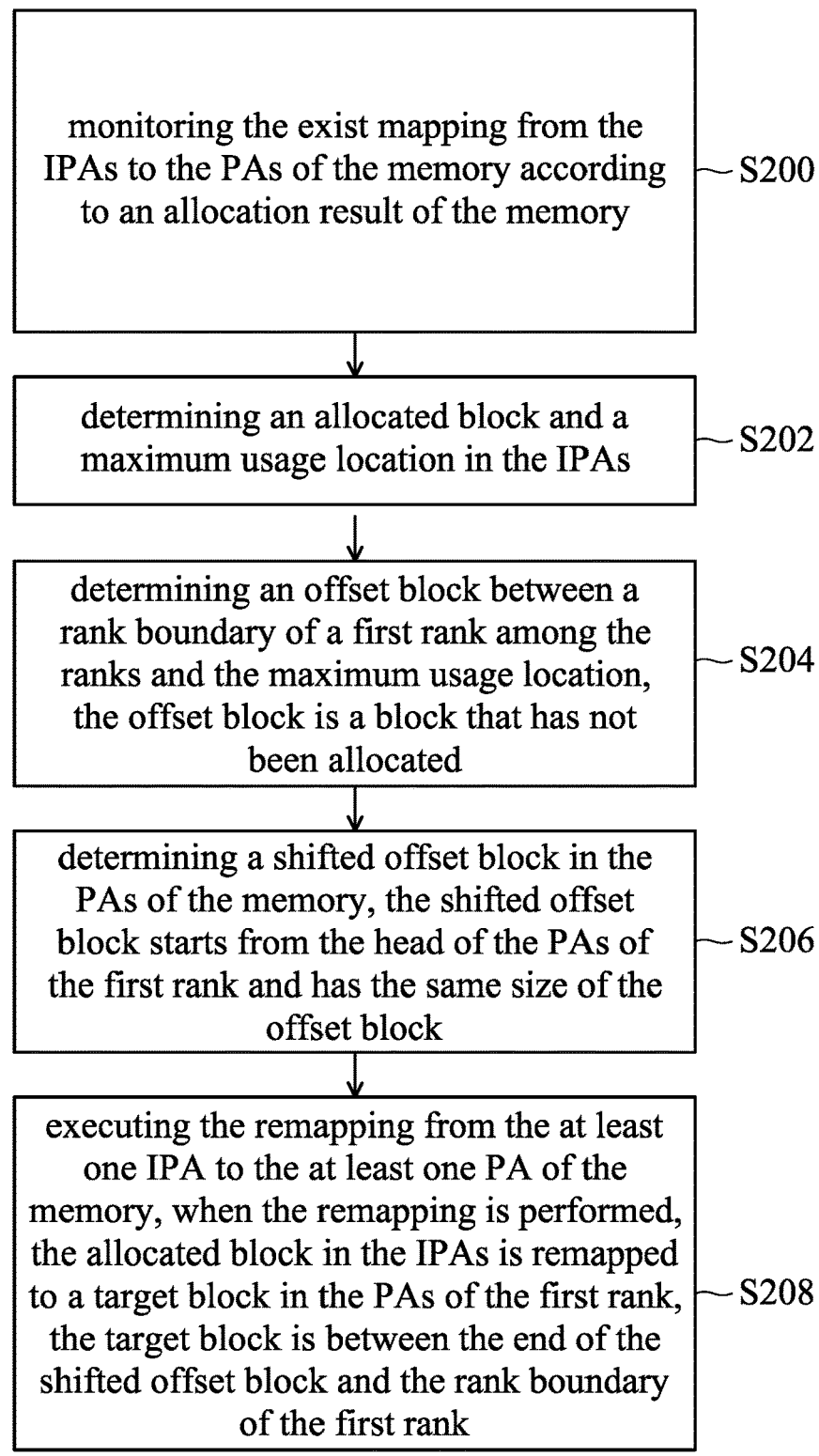
FIG. 2 is a detailed flow chart of steps S100~S102 in FIG. 1 in accordance with some embodiments of the present invention.

FIG. 2 is a detailed flow chart of the steps S100~S102 in FIG. 1 in accordance with some embodiments of the present invention. The flow chart of FIG. 2 may be executed in the period of memory allocation.

As shown in FIG. 2, the step S100 in FIG. 1 includes the following step. The extant mapping from the IPAs to the PAs of the memory is monitored according to an allocation result of the memory (step S200). In some embodiments, the allocation result may include at least the mapping relationship between IPAs and PAs of the memory, but the present invention is not limited thereto. In other embodiments, the allocation result may include more or less information, for example, the allocation result May include information that indicates which of the IPAs and the PAs of the memory have been allocated to at least one application. In other embodiments, the extant mapping from the IPAs to the PAs of the memory may be monitored by other information, for example, an information received from applications (that is, APPs), or any other information that indicates the mapping relationship between IPAs and PAs of the memory.

As shown in FIG. 2, the step S102 in FIG. 1 includes the following steps. An allocated block and a maximum usage location are determined in the IPAs (step S202). An offset block between a rank boundary of a first rank and the maximum usage location is determined in the IPAs, wherein the offset block is a block that hasn't been allocated (that is, the offset block isn't allocated to any application) (step S204). In some embodiments, in step S202, also determines an allocated block in the PAs, and the allocated block in the PAs maps to the allocated block in the IPAs. A shifted offset block is determined in the PAs of the memory. The shifted offset block starts from the head of the PAs of the first rank and has the same size of the offset block (step S206). The remapping from the at least one IPA to the at least one PA of the memory is executed, when the remapping is executed, the allocated block in the IPAs is remapped to a target block in the PAs of the first rank, wherein the target block is between the end of the shifted offset block and the rank boundary of the first rank (step S208). The result of step S208 makes the mapping of the allocated block in the IPAs be shifted compared to general method (in which the allocated block in the IPAs is mapped to the head of the PAs). In some embodiments, the allocated block and a maximum usage location are determined according to a memory footprint of the memory, but the present invention is not limited thereto. In other embodiments, the allocated block and a maximum usage location may be determined according to information received from applications, or any other information that indicates the usage of IPAs and PAs of the memory.

In some embodiments, an unallocated block is determined in the IPAs before step S208, wherein the unallocated block starts from the tail of the IPAs of a second rank of the memory and has the same size of the offset block. In this condition, in step S208, when performing the mapping, the unallocated block is mapped to the shifted offset block and the remaining IPAs of the first and second ranks of the memory are mapped to the PAs of the second rank of the memory.

Thus, according to some embodiments, the allocated block in the IPAs is remapped to a target block in the PAs of a first rank of the memory. Since the target block is between the end of the shifted offset block and the rank boundary of the first rank, the PAs that an application used can be concentrated to the first rank of the memory. As a result, the present invention reduces the frequencies of switching between different ranks when an application accesses the memory, and the power consumption of the electronic device is also reduced. Besides for a new application, the IPAs and PAs which can use starts from the beginning of a new rank (such as a second rank), thus the present invention also increases the possibility of concentrating the PAs used by a new application to a same rank (such as a second rank) of the memory. As a result, the frequencies of switching between different ranks when a new application accesses the memory is reduced, and the power consumption of the electronic device can be further reduced.

In some embodiments, steps S200, S202, S204 and S206 are executed by the first MMU of the processor or the other component (such as those mentioned above) of the electronic device, and step S208 is executed by the second MMU of the processor or the other component of the electronic device, but the present invention is not limited thereto. In some embodiments, steps S200, S202, S204, S206 and step S208 are executed by the second MMU of the processor or the other component of the electronic device.

Figure 3:
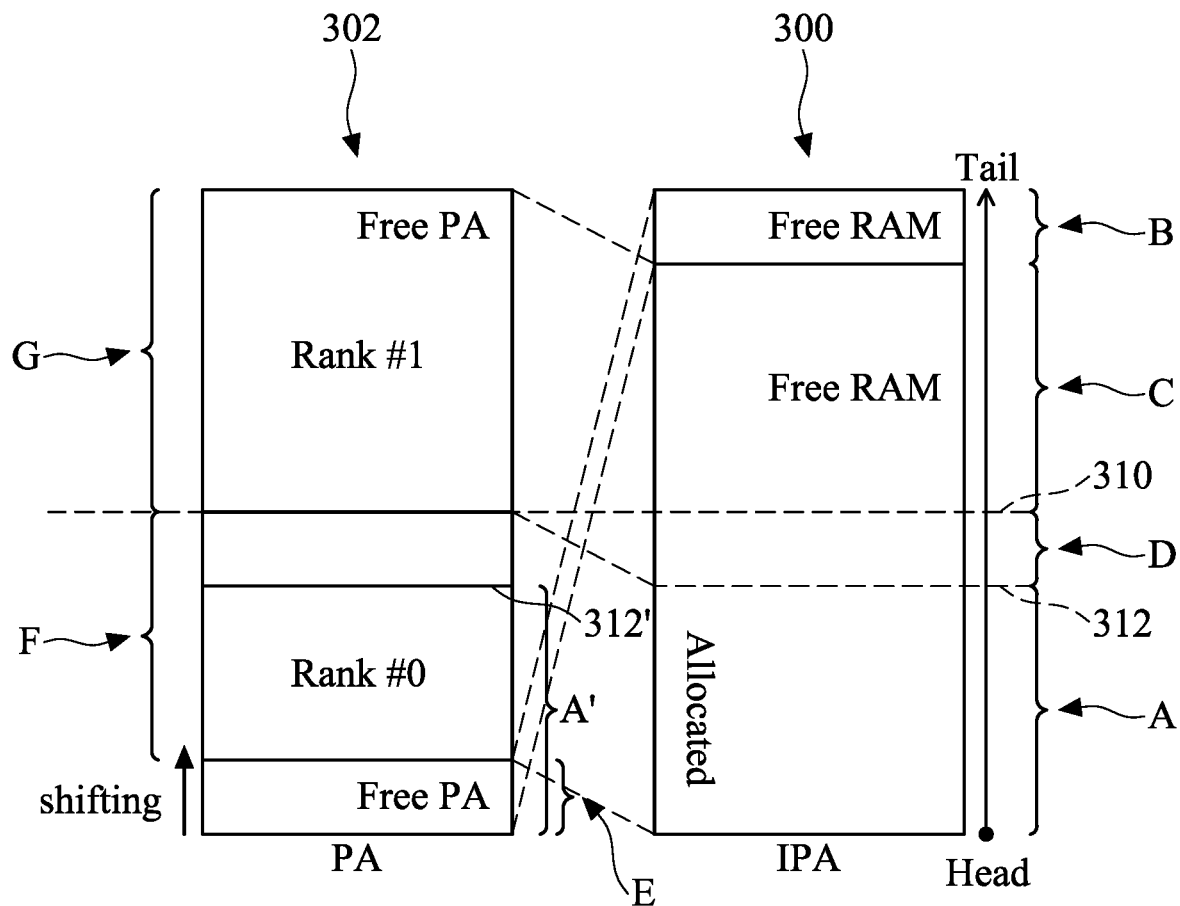
FIG. 3 is a schematic diagram of steps S200 to S206 in FIG. 2 in accordance with some embodiments of the present invention.

FIG. 3 is a schematic diagram of steps S200 to S206 in FIG. 2 in accordance with some embodiments of the present invention. As shown in FIG. 3, a memory space 300 for IPAs of a memory and a memory space 302 for PAs of the memory are present.

Referring to FIG. 2 together with FIG. 3, in steps S200~S202, the method of the present invention monitors an extant mapping from IPAs to PAs of the memory and determines an allocated block (such as block A in FIG. 3) and a maximum usage location (such as a limitation dotted line 312 in FIG. 3). It should be noticed that, although not illustrating, the allocated block A and the maximum usage location 312 in the memory space 300 correspond to an allocated block A' and a maximum usage location 312' in the memory space 302, respectively.

Referring to FIG. 2 together with FIG. 3, in step S204, the method of the present invention determines an offset block (such as block D in FIG. 3) from a rank boundary 310 to the maximum usage location (the limitation dotted line 312). In step S206, the method of the present invention determines a shifted offset block (such as block E in FIG. 3), then an unallocated block is determined (such as block B in FIG. 3). The marks "Free RAM" and "Free PA" in FIG. 3 indicate the corresponding blocks haven't been allocated to any application.

Refers to FIG. 2 together with FIG. 3, in step S208, the method of the present invention executes the remapping from the IPAs to the PAs of the memory, wherein when performing the remapping, the allocated block (such as block A in FIG. 3) is remapped to a target block (such as block F in FIG. 3) of the first rank (such as Rank #0 in FIG. 3). Besides, wherein when performing the remapping, the unallocated block (such as block B in FIG. 3) are remapped to the shifted offset block (such as block E in FIG. 3) of the first rank (such as Rank #0 in FIG. 3), and the remaining IPAs of the first and second ranks (such as block C in FIG. 3) are remapped to the PAs (such as block G in FIG. 3) of the second rank (such as Rank #1 in FIG. 3).

As a result, as shown in FIG. 3, the allocated block A is remapped to a target block F in Rank #0 of a memory. As a result, the present invention reduces the frequencies of switching between different ranks when an application accesses the memory.

In some embodiments, the present invention may allocate the IPAs starting from block D of the memory space 300 (because block A of the memory space 300 has been allocated) to a new application, so that rank 1 (Rank #1) of the memory space 302 may be allocated to the new application. Thus, the present invention also increases the possibility of concentrating the PAs used by a new application to a same rank (such as Rank #1) of the memory.

In some embodiments, the memory space 300 may be an address space of a memory and the memory space 302 may be the physical address space of the memory, but the present invention is not limited thereto.

Figure 4:
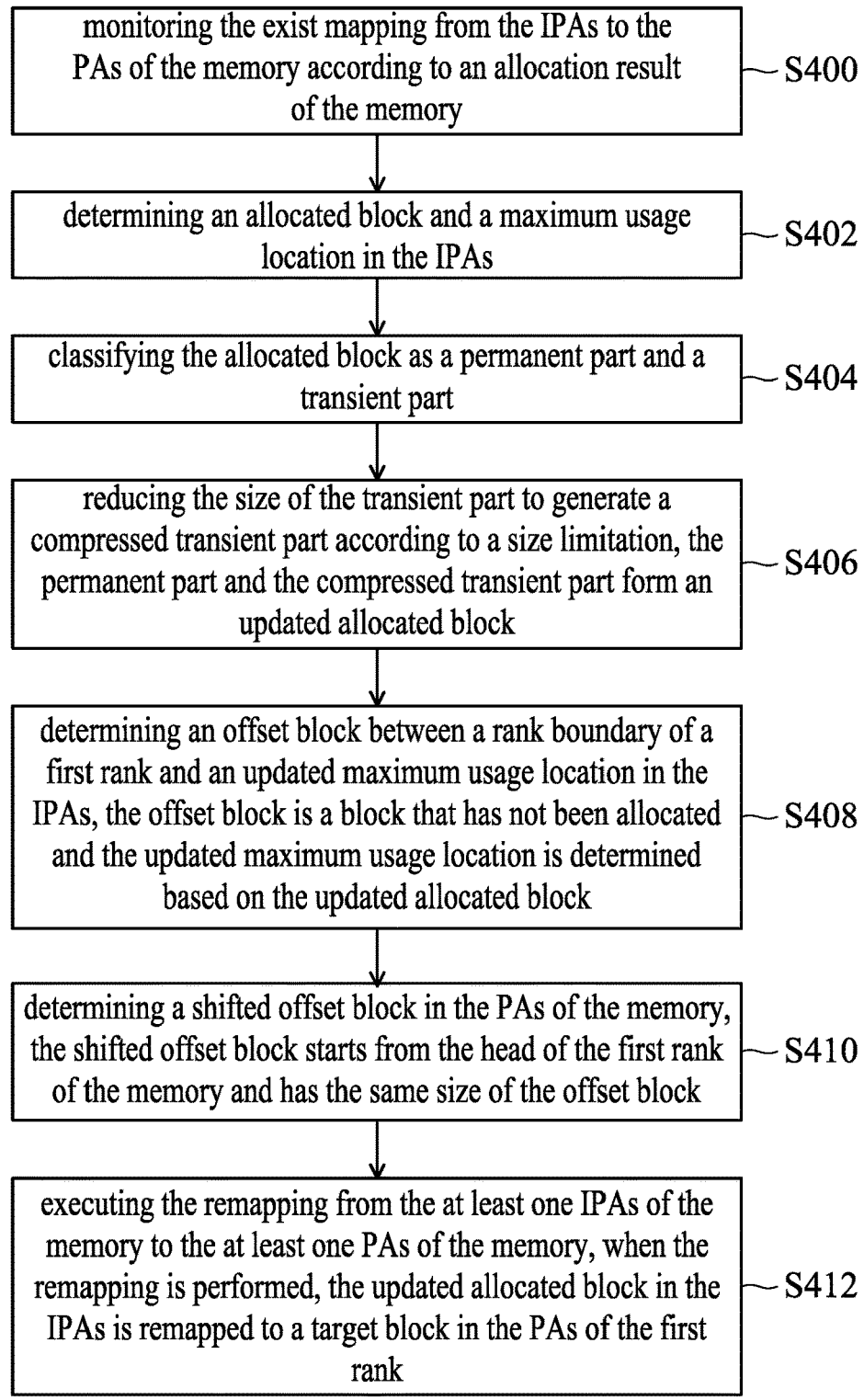
FIG. 4 is a detailed flow chart of steps S100~S102 in FIG. 1 in accordance with some embodiments of the present invention.

FIG. 4 is a detailed flow chart of the steps S100~S102 in FIG. 1 in accordance with some embodiments of the present invention. In some embodiments, when the size of the allocated block is larger than the size of a rank of the memory, the steps in FIG. 4 are executed.

As shown in FIG. 4, the step S100 in FIG. 1 includes the following step. The extant mapping from the IPAs to the PAs of the memory is monitored according to an allocation result of the memory (step S400). The details of step S400 is the same as step S200, so the detailed description for step S400 is omitted herein.

As shown in FIG. 4, the step S102 in FIG. 1 includes the following steps. An allocated block and a maximum usage location are determined in the IPAs (step S402). The allocated block is classified as a permanent part and a transient part (step S404). The size of the transient part is reduced to generate a compressed transient part according to a size limitation, and the permanent part and the compressed transient part form an updated allocated block (step S406). An offset block between a rank boundary of a first rank and an updated maximum usage location is determined in the IPAs, wherein the offset block is a block that has not been allocated and the updated maximum usage location is determined based on the updated allocated block (step S408). A shifted offset block is determined in the PAs of the memory, wherein the shifted offset block starts from the head of the first rank of the memory and has the same size of the offset block (step S410). The remapping from the at least one IPA of the memory to the at least one PA of the memory is executed, wherein when performing the remapping, the updated allocated block in the IPAs is remapped to a target block in the PAs of the first rank (step S412). The details of step S402 is the same as step S202, so the detailed description for step S402 is omitted herein. The details of steps S408~S412 are the same as steps S204~S208, respectively, so the detailed description for steps S408~S412 are omitted herein.

Figure 5:
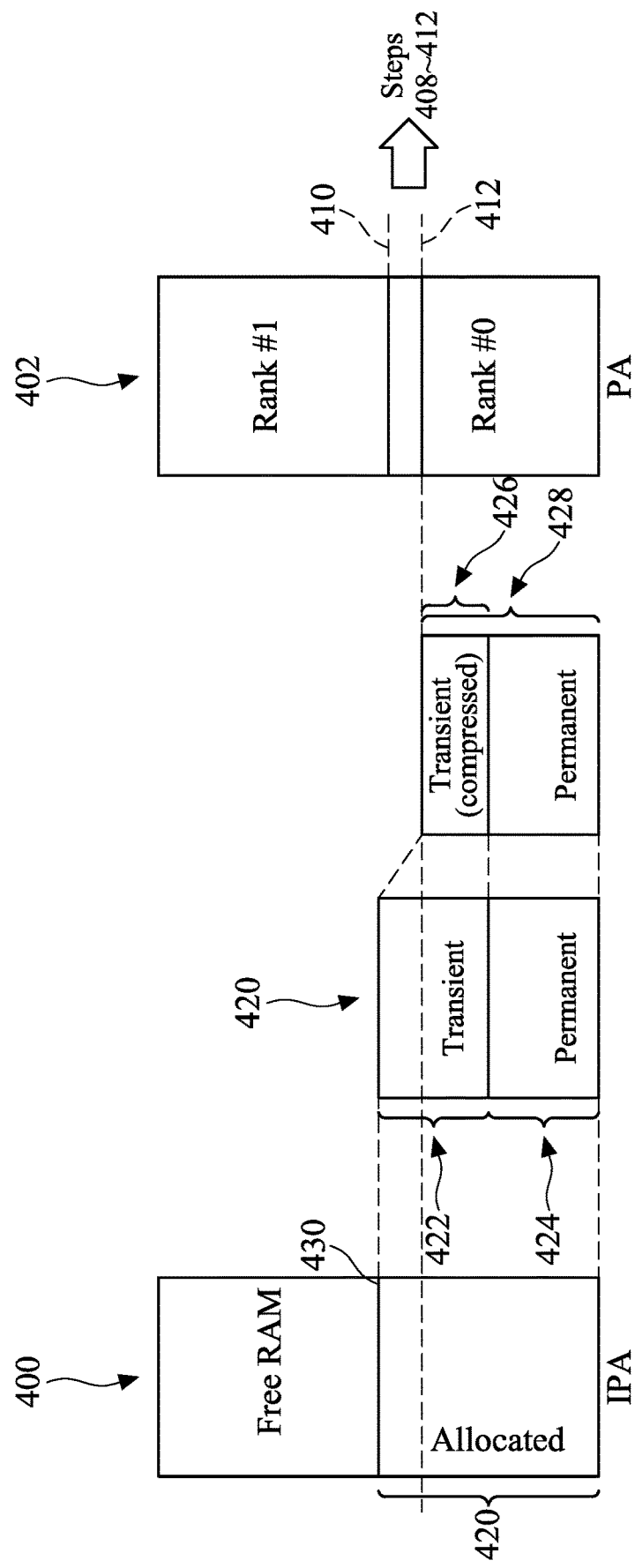
FIG. 5 is a schematic diagram of steps S400 to S412 in FIG. 4 in accordance with some embodiments of the present invention.

FIG. 5 is a schematic diagram of steps S400 to S412 in FIG. 4 in accordance with some embodiments of the present invention. As shown in FIG. 5, a memory space 400 for IPAs of a memory and a memory space 402 for PAs of a memory are present.

Referring to FIG. 4 together with FIG. 5, in steps S400~S402, the method of the present invention monitors the extant mapping from the IPAs to the PAs of the memory and determines an allocated block (for example, marked as Allocated at block 420 in FIG. 5) and a maximum usage location (for example, marked as solid line 430 in FIG. 5). As shown in FIG. 5, the size (also marked as 430) of the allocated block is larger than the size (for example, marked as 410) of a rank of the memory. Although not illustrating, the allocated block and the maximum memory usage location in the memory space 400 correspond to an allocated block and a maximum memory usage location in the memory space 402, respectively.

Referring to FIG. 4 together with FIG. 5, in step S404, the method of the present invention classifies the allocated block to a permanent part (for example, marked as Permanent at block 424 in FIG. 5) and a transient part (for example, marked as Transient at block 422 in FIG. 5).

Referring to FIG. 4 together with FIG. 5, in step S406, the method of the present invention reduces the size of the transient part (for example, block 422) to generate the compressed transient part (for example, marked as Transient (compressed) in block 426) according to a size limitation (for example, marked as 412), and the permanent part and the compressed transient part form an updated allocated block (for example, block 428 in memory space 400), it should be noticed that, although not illustrating, there is an updated allocated block in memory space 402 which maps to block 428. In some embodiments, in the step S406, the method of the present invention compresses, hot-cold page selects, and/or swaps the transient part to generate the compressed transient part.

Referring to FIG. 4 together with FIG. 5, after step S406, the method of the present invention implements steps S408~S412. The details of steps S408~S412 are the same as steps S204~S208, respectively, so the detailed description for steps S408~S412 are omitted.

Figure 6:
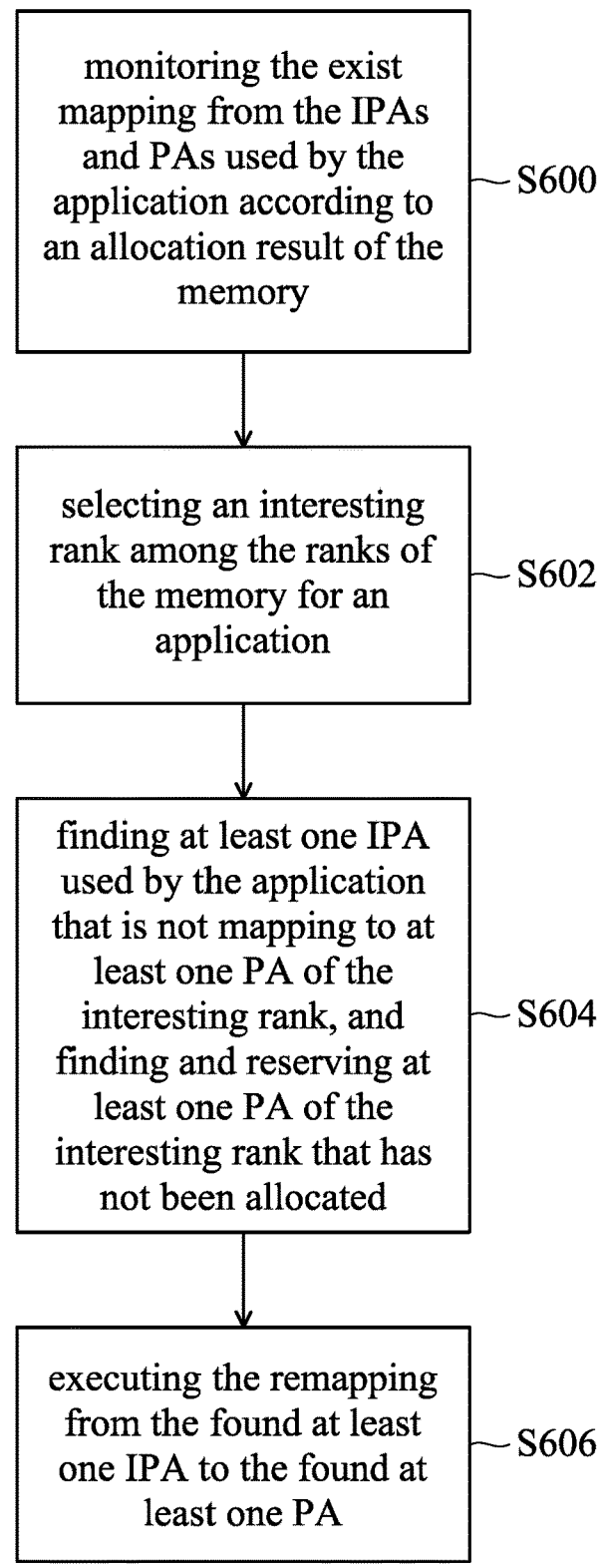
FIG. 6 is a detailed flow chart of steps S100~S102 in FIG. 1 in accordance with some embodiments of the present invention.

FIG. 6 is a detailed flow chart of steps S100~S102 in FIG. 1 in accordance with some embodiments of the present invention. The flow chart of FIG. 6 may be executed in the period of memory allocation or in the period of accessing the memory.

As shown in FIG. 6, the step S100 in FIG. 1 includes the following step. The extant mapping from the IPAs and PAs used by the application is monitored according to an allocation result of the memory (step S600). In some embodiments, the details of step S600 is the same as step S200, so the detailed description for step S600 is omitted herein.

As shown in FIG. 6, the step S102 in FIG. 1 includes the following steps. An interesting rank among the ranks of the memory is selected for an application (step 602). In some embodiments, the method of the present invention selects one rank with the most accesses by an application among the ranks as the interesting rank. At least one IPA used by the application that is not mapping to at least one PA of the interesting rank is found, and at least one PA of the interesting rank that has not been allocated is found and reserved (step S604). The remapping from the found at least one IPA to the found at least one PA is executed (step S606). Some embodiments, when executing the steps S602~S604, can use the memory footprint of the memory as assistant information, but the present invention is not limited thereto.

Figure 7A:
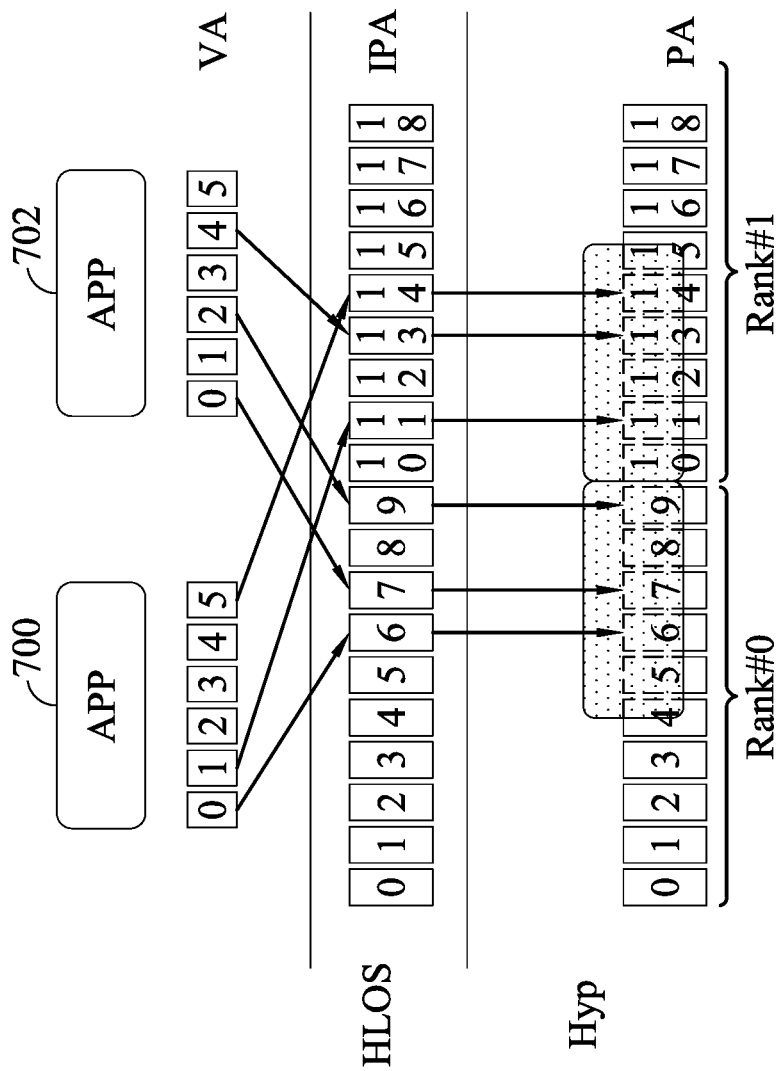
FIGS. 7A and 7B are schematic diagrams of steps S600 to S606 in FIG. 6 in accordance with some embodiments of the present invention.
Figure 7B:
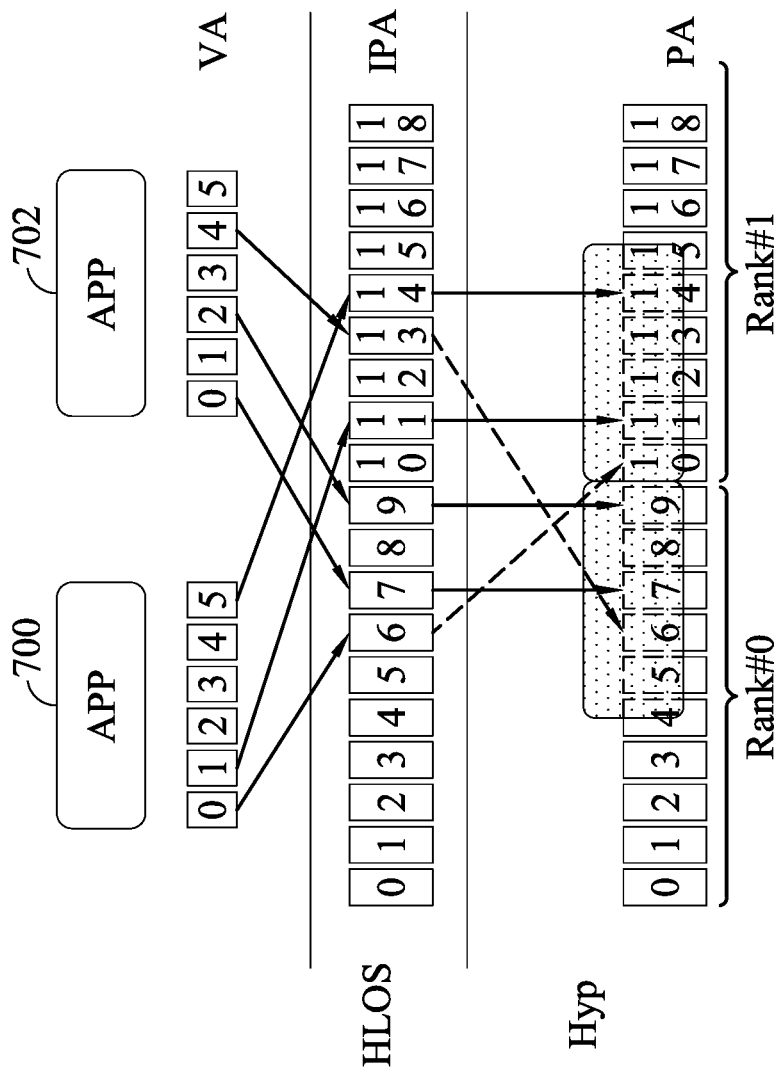

FIGS. 7A and 7B are schematic diagrams of steps S600 to S606 in FIG. 6 in accordance with some embodiments of the present invention. For example, As shown in FIGS. 7A and 7B, applications 700 and 702 are accessing a dual-rank DRAM. A first mapping from the VAs to the IPAs for the application 700 may be shown as follows. Block 0 in the VAs may map to block 6 in the IPAs. Block 1 in the VAs may map to block 11 in the IPAs. Block 5 in the VAs may map to block 14 in the IPAs. In addition, the first mapping from the VAs to the IPAs for the application 702 may be shown as follows. Block 0 in the VAs may map to block 7 in the IPAs. Block 2 in the VAs may map to block 9 in the IPAs. Block 4 in the VAs may map to block 13 in the IPAs. Also, as shown in FIG. 7A, before remapping, an extant mapping from the IPAs to the PAs for the application 700 may be shown as follows. Block 6 in the IPAs may map to block 6 in the PAs. Block 11 in the IPAs may map to block 11 in the PAs. Block 14 in the IPAs may map to block 14 in the PAs. In addition, an extant mapping from the IPAs to the PAs for the application 702 may be shown as follows. Block 7 in the IPAs may map to block 7 in the PAs. Block 9 in the IPAs may map to block 9 in the PAs. Block 13 in the IPAs may map to block 13 in the PAs. In some embodiment, the mapping relationship between the VAs and the IPAs, or/and the mapping relationship between the IPAs and the PAs are indicated by an allocation result of the memory.

Referring to FIG. 6 together with FIG. 7A, in step S600, the method of the present invention monitors an extant mapping from the IPAs and PAs used by an application according to an allocation result of the memory. For example, as shown in FIG. 7A, before remapping, an extant mapping from the IPAs to the PAs for the application 700 may be monitored as follows. Block 6 in the IPAs maps to block 6 in the PAs. Block 11 in the IPAs maps to block 11 in the PAs. Block 14 in the IPAs maps to block 14 in the PAs. In addition, an extant mapping from the IPAs to the PAs for the application 702 may be monitored as follows. Block 7 in the IPAs maps to block 7 in the PAs. Block 9 in the IPAs maps to block 9 in the PAs. Block 13 in the IPAs maps to block 13 in the PAs.

Referring to FIG. 6 together with FIG. 7A, in step S602, the method of the present invention selects an interesting rank among the ranks for the application. For example, as shown in FIG. 7A, blocks 0~9 correspond to rank 0 (Rank #0) and blocks 10~18 correspond to rank 1 (Rank #1). Since most of the PAs (for example, blocks 11 and 14) the application 700 accesses are in rank 1, but only one PA (for example, block 6) the application 700 accesses is in rank 0, the method of the present invention selects rank 1 as the interesting rank of application 700. Similarly, since most of the PAs (for example, blocks 7 and 9) the application 702 accesses are in rank 0, only one PA (for example, block 13) the application 702 accesses is in rank 1, the method of the present invention selects rank 0 as the interesting rank of application 702. In some embodiments, the PAs an application has accessed (used or been allocated) may be indicated by the mapping from VAs to IPAs, or the mapping from IPAs to PAs.

Referring to FIG. 6 together with FIG. 7A, in step S604, the method of the present invention monitors an extant mapping from the IPAs and PAs of the interesting rank used by the application, and finds at least one IPA used by the application that is not mapping to at least one PA in the interesting rank. For example, as shown in FIG. 7A, for the application 700, since the interesting rank is rank 1, block 6 in the IPAs used by the application 700 is mapping to block 6 in the PAs in rank 0 rather than any PA in the interesting rank1, the method of the present invention finds block 6 as the IPA used by the application 700 that is not mapping to any PA in the interesting rank 1. Similarly, for the application 702, since the interesting rank is rank 0, block 13 in the IPAs used by the application 702 is mapping to block 13 in the PAs in rank 1 rather than any PA in the interesting rank0, the method of the present invention finds block 13 as the IPA used by the application 702 that is not mapping to any PA in the interesting rank 0. In some embodiments, whether an IPA is mapping to at least one PA in the interesting rank may be indicated by the mapping from VAs to IPAs, or the mapping from IPAs to PAs.

After that, also in step S604, the method of the present invention finds and reserves at least one PA in the interesting rank that hasn't been allocated. For example, as shown in FIG. 7A, for the application 700, since the interesting rank is rank 1, the method of the present invention finds and reserves an unallocated block 10 in the PAs in rank it. Similarly, for the application 702, since the interesting rank is rank 0, the method of the present invention finds and reserves an unallocated block 6 in the PAs in rank 0.

Referring to FIG. 6 together with FIG. 7B, in step S606, the method of the present invention remaps the found at least one IPA to the found at least one PA. For example, as shown in FIG. 7B, for the application 700, the method of the present invention remaps block 6 in the IPAs to block 10 in the PAs in the interesting rank (that is, rank 1). Similarly, for the application 702, the method of the present invention remaps block 13 in the IPAs to block 6 in the PAs in the interesting rank (that is, rank 0).

In some embodiments, steps S600 to S604 may be executed by the first MMU, for example, S1 MMU in the processor or S1 SMMU in the other component of the electronic device, and step S606 may be executed by the second MMU, for example, S2 MMU in the processor or S2 SMMU in the other component of the electronic device. In some embodiments, steps S600 to S606 are executed by the second MMU.

In some embodiments, before new access command is received, application 700 only need to access rank 1 (Rank #1). And before new access command is received, application 702 only need to access rank 0 (Rank #0). Thus, the present invention reduces the frequencies of switching between different ranks when an application (for example application 700 and application 702) accesses the memory, and the power consumption of the electronic device is also reduced.

Figure 8:
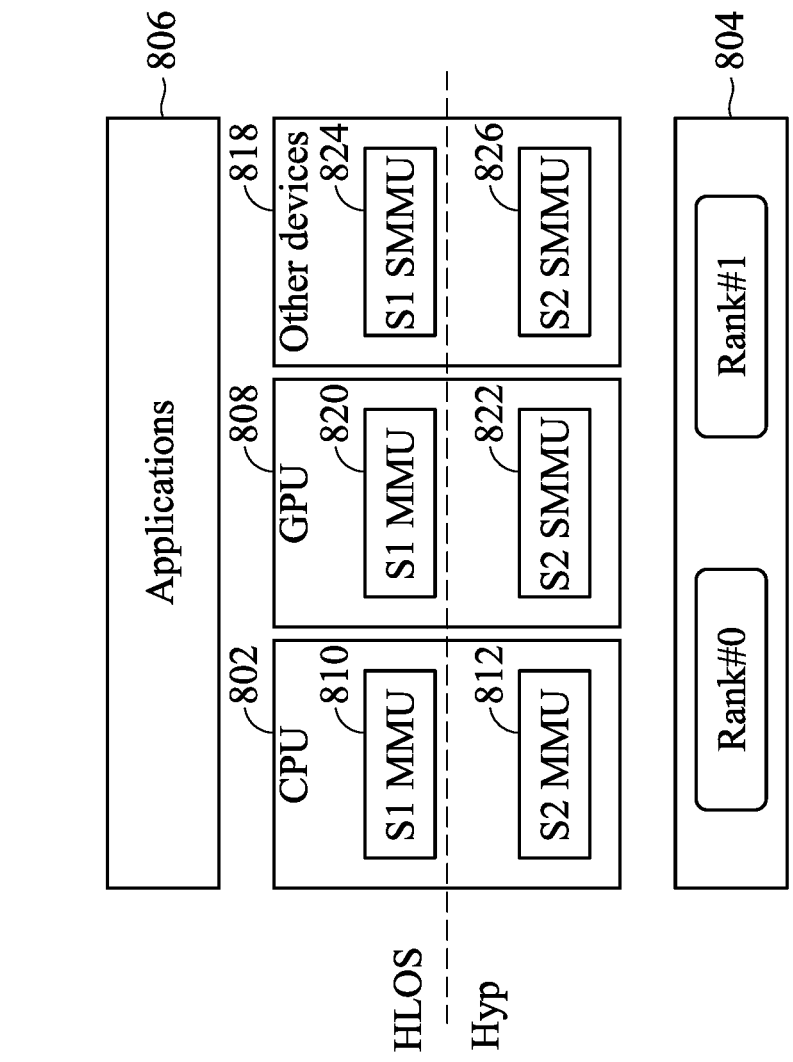
FIG. 8 is a schematic diagram of an electronic device 800 in accordance with some embodiments of the present invention.

FIG. 8 is a schematic diagram of an electronic device 800 in accordance with some embodiments of the present invention. As shown in FIG. 8, the electronic device 800 includes a processor 802, a graphics processing unit (GPU) 808, other devices 818, and a memory 804. In some embodiments, the processor 802, the graphics processing unit (GPU) 808, and the other devices 818 are examples of memory access request module mentioned above. In some embodiments, applications 806 are executed by the processor 802. In some embodiments, the processor 802 executes the applications 806 to access the memory 804 resulting in the memory footprint. In some embodiments, the processor 802 includes a S1 MMU 810 and a S2 MMU 812. The GPU 808 includes a S1 MMU 820 and a S2 SMMU 822. Other devices 818 include a S1 SMMU 824 and a S2 SMMU 826. In some embodiments, the S1 MMU 810, the S1 MMU 820, and the S1 SMMU 824 are operated by a high-level operating system (HLOS). The S2 MMU 812, the S2 MMU 822, and the S2 SMMU 826 are operated by a hypervisor. In some embodiments, the memory 804 includes a rank 0 (Rank #0) and a rank 1 (Rank #1).

In some embodiments, step S100 in FIG. 1, steps S200 to S206 in FIG. 2, steps S400 to S410 in FIG. 4, and steps S600 and S604 are executed by the S1 MMU 810, the S1 MMU 820, and/or the S1 SMMU 824. In some embodiments, step S102 in FIG. 1, step S208 in FIG. 2, step S412 in FIG. 4, and step S606 in FIG. 6 are executed by the S2 MMU 812, the S2 MMU 822, and/or the S2 SMMU 826. In some embodiments, all the steps in FIG. 1, FIG. 2, FIG. 4 and FIG. 6 are executed by the S2 MMU 812, the S2 MMU 822, and/or the S2 SMMU 826. In some embodiments, the processor 802 may be a central processing unit (CPU) in an electronic device, such as desktop, laptop, tablet, and smart phone, but the present invention is not limited thereto.

Figure 9:
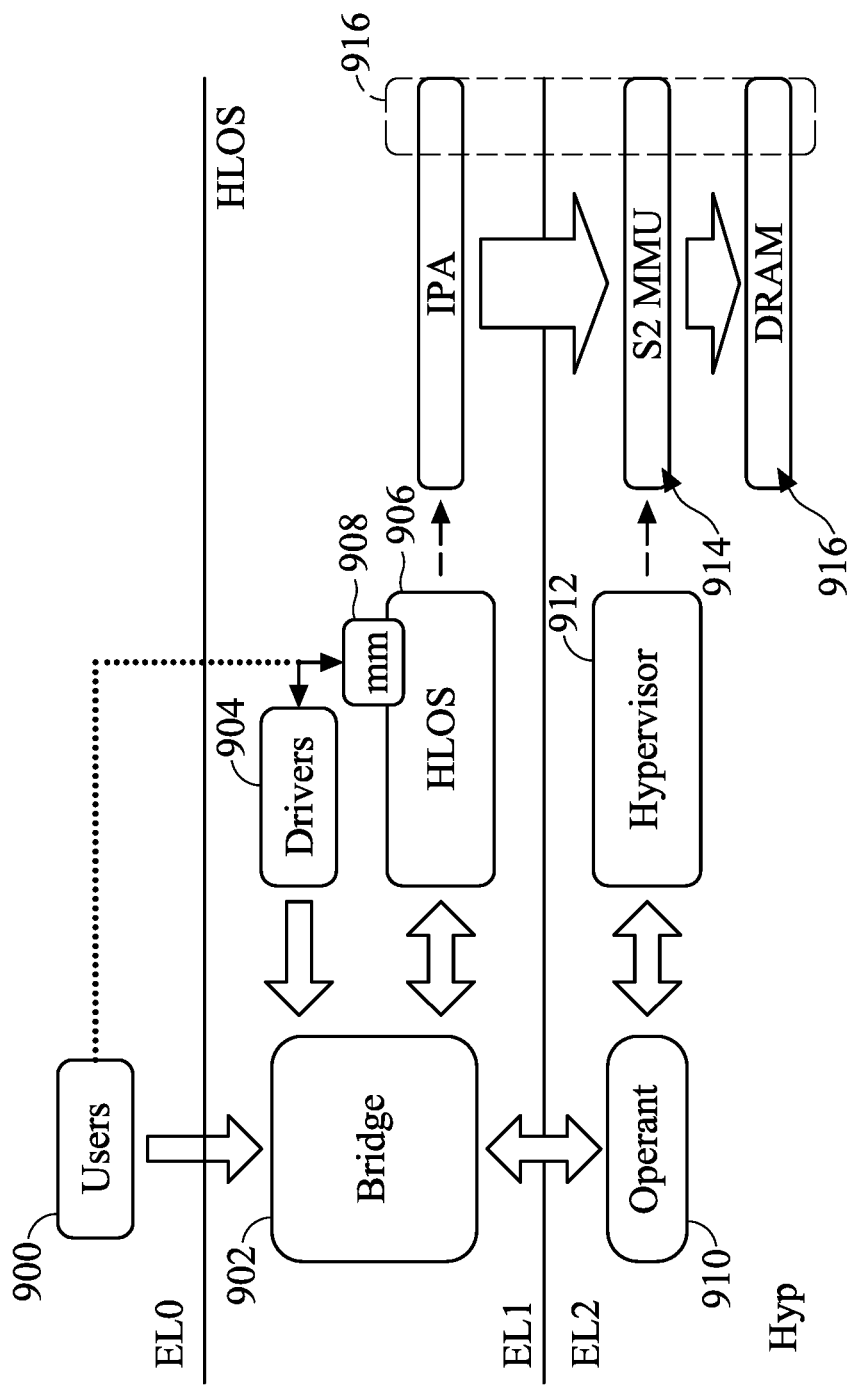
FIG. 9 is a schematic diagram of software structures of the electronic device 800 for performing steps S600 to S606 in FIG. 6 in accordance with some embodiments of the present invention.

FIG. 9 is a schematic diagram of software structures of the electronic device 800 for performing steps S600 to S606 in FIG. 6 in accordance with some embodiments of the present invention. In some embodiments, the software structures of the electronic device 800 are built under ARM architecture. As shown in FIG. 9, when users 900 operate the electronic device 800, for example, applications in EL0 layer are executed on the processor, a bridge 902 operated by the HLOS receives access commands from the users 900, and/or instructions from drivers 904. In some embodiments, applications in EL0 layer may directly send the access command to a memory management (mm) subsystem which includes mm unit 908 (for example, the S1 MMU). The bridge 902 in EL1 layer sends the corresponding requests to the MMU 908 operated by the HLOS. Thus, the MMU 908 monitors the extant mapping from the IPAs to the PAs of the memory according to an allocation result of a memory 916 (step S600). In some embodiments, the memory 916 may be a DRAM, but the present invention is not limited thereto. An interesting rank among the ranks of the memory is selected by the MMU 908 for an application (step 602).

The MMU 908 finds at least one IPA used by the application that is not mapping to at least one PA of the interesting rank (step S604). In some embodiments, the MMU 908 sends information of the found at least one IPA used by the application that is not mapping to the at least one PA of the interesting rank to an operant 910 in EL2 layer through the bridge 902. The operant 910 sends the corresponding requests to a hypervisor 912 based on the information of the found at least one IPA, so that a S2 MMU 914 can be operated by the hypervisor 912. In some embodiments, the S2 MMU 914 finds and reserves the at least one PA of the interesting rank that has not been allocated (step S604). After that, the S2 MMU 914 executes the remapping from the found at least one IPA to the found at least one PA (step S606).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for intermediate physical address (IPA) remapping, comprising:
    monitoring an extant mapping from IPAs to physical addresses (PAs) of a memory having multiple ranks; and
    executing a remapping from at least one IPA to at least one PA to concentrate the PAs of the memory used by an application into one of the ranks of the memory;
    wherein a rank boundary is present between any two adjacent ranks;
    wherein the step of executing the remapping comprises:
    determining an allocated block and a maximum usage location in the IPAs; wherein an offset block is between the rank boundary of a first rank among the ranks and the maximum usage location, and the offset block is a block that has not been allocated;
    determining a shifted offset block in the PAs of the memory; wherein the shifted offset block starts from a head of the PAs of the first rank and has the same size of the offset block; and executing the remapping from the at least one IPA to the at least one PA of the memory, wherein when the remapping is executed, the allocated block in the IPAs is remapped to a target block in the PAs of the first rank, wherein the target block is between the end of the shifted offset block and the rank boundary of the first rank.

2. The method as claimed in claim 1, wherein the step of monitoring the extant mapping from the IPAs to the PAs of the memory comprises:

monitoring the extant mapping from the IPAs to the PAs of the memory according to an allocation result of the memory.

3. The method as claimed in claim 1, wherein the step of executing the remapping further comprises:

determining an unallocated block in the IPAs, wherein the unallocated block starts from a tail of the IPAs of a second rank of the memory and has the same size of the offset block;

wherein when the remapping is executed, the unallocated block is mapped to the shifted offset block in the PAs.

4. The method as claimed in claim 3, wherein the step of executing the remapping further comprises:

mapping the remaining IPAs of the first and second ranks of the memory to the PAs of the second rank of the memory when the remapping is executed.

5. The method as claimed in claim 2, wherein the step of executing the remapping comprises:

classifying the allocated block as a permanent part and a transient part;

reducing the size of the transient part to generate a compressed transient part according to a size limitation, wherein the permanent part and the compressed transient part form an updated allocated block; wherein the offset block is between the rank boundary of the first rank among the ranks and an updated maximum usage location in the IPAs;

determining the shifted offset block in the PAs of the memory; and executing the remapping from the IPAs of the memory to the PAs of the memory; wherein when the remapping is executed, the updated allocated block in the IPAs is remapped to the target block in the PAs of the first rank.

6. The method as claimed in claim 5, wherein the step of executing the remapping further comprises:

determining an unallocated block in the IPAs, wherein the unallocated block starts from the tail of the IPAs of a second rank of the memory and has the same size of the offset block;

wherein when the remapping is executed, the unallocated block is mapped to the shifted offset block in the PAs.

7. The method as claimed in claim 6, wherein the step of executing the remapping further comprises:

mapping the remaining IPAs of the first and second ranks of the memory to the PAs of the second rank of the memory when the remapping is executed.

8. The method as claimed in claim 5, wherein the compressed transient part is generated by compressing, hot-cold page selecting, and/or swapping the transient part.

9. The method as claimed in claim 2, wherein the step of executing the remapping comprises:

selecting an interesting rank among the ranks of the memory for the application based on a memory footprint of the memory;

finding at least one IPA used by the application that is not mapping to at least one PA of the interesting rank;

finding and reserving at least one PA of the interesting rank that has not been allocated; and executing the remapping from the found at least one IPA to the found at least one PA.

10. An electronic device, comprising:

a memory, having multiple ranks, wherein a rank boundary is present between any two adjacent ranks;

a memory access request module, electrically connected to the memory, configured to monitor an extant mapping from intermediate physical addresses (IPAs) to physical addresses (PAs) of the memory and execute a remapping from at least one IPA to at least one PA to concentrate the PAs of the memory used by an application into one of the ranks of the memory;

wherein the memory access request module comprises a first memory management unit (MMU) and a second MMU;

wherein the first MMU or the second MMU is configured to:

monitor the extant mapping from the IPAs to the PAs of the memory according to an allocation result of the memory;

determine an allocated block and a maximum usage location in the IPAs; wherein an offset block is between the rank boundary of a first rank among the ranks and the maximum usage location, and the offset block is a block that has not been allocated; and determine a shifted offset block in the PAs of the memory; wherein the shifted offset block starts from a head of the PAs of the first rank and has the same size of the offset block;

wherein the second MMU is configured to:

execute the remapping from the IPAs to the PAs of the memory, wherein when the remapping is executed, the allocated block in the IPAs is remapped to a target block in the PAs of the first rank, wherein the target block is between the end of the shifted offset block and the rank boundary of the first rank.

11. The electronic device as claimed in claim 10, wherein the first MMU or the second MMU is further configured to:

determine an unallocated block in the IPAs, wherein the unallocated block starts from a tail of the IPAs of a second rank of the memory and has the same size of the offset block; and the second MMU is further configured to:

remap the unallocated block to the shifted offset block in the PAs; and remap the remaining IPAs of the first and second ranks of the memory to the PAs of the second rank of the memory.

12. The electronic device as claimed in claim 10, wherein the first MMU or the second MMU is configured to:

determine the allocated block and the maximum usage location in the IPAs based on the allocation result;

classify the allocated block as a permanent part and a transient part;

reduce the size of the transient part to generate a compressed transient part according to a size limitation, wherein the permanent part and the compressed transient part form an updated allocated block; wherein the offset block is between the rank boundary of the first rank among the ranks and an updated maximum usage location in the IPAs;

determine the shifted offset block in the PAs of the memory.

13. The electronic device as claimed in claim 12, wherein the second MMU is configured to:

execute the remapping from the IPAs of the memory to the PAs of the memory; wherein when the remapping is executed, the updated allocated block in the IPAs is remapped to a target block in the PAs of the first rank.

14. The electronic device as claimed in claim 13, wherein the first MMU or the second MMU is further configured to:
  determine an unallocated block in the IPAs, wherein the unallocated block starts from a tail of the IPAs of a second rank of the memory and has the same size of the offset block; and
  the second MMU is further configured to:
  remap the unallocated block to the shifted offset block in the PAs; and
  remap the remaining IPAs of the first and second ranks of the memory to the PAs of the second rank of the memory.

15. The electronic device as claimed in claim 12, wherein the compressed transient part is generated by compressing, hot-cold page selecting, and/or swapping the transient part.

16. The electronic device as claimed in claim 10, wherein the first MMU or the second MMU is configured to:
  monitor the extant mapping from the IPAs to the PAs of the memory according to an allocation result of the memory;
  select an interesting rank among the ranks of the memory for the application based on a memory footprint of the memory;
  find at least one IPA used by the application that is not mapping to at least one PA of the interesting rank; and
  find and reserve the at least one PA of the interesting rank that has not been allocated.

17. The electronic device as claimed in claim 16, wherein the second MMU is further configured to:
  execute the remapping from the found at least one IPA to the found at least one PA.

18. The electronic device as claimed in claim 10, wherein the first MMU is a S1 MMU, and the second MMU is a S2 MMU; or wherein the first MMU is a S1 system MMU (SMMU), and the second MMU is a S2 SMMU.

19. The electronic device as claimed in claim 10, wherein the first MMU is operated by a high-level operating system (HLOS), and the second MMU is operated by a hypervisor.

* * * * *